UNITED STATES PATENT OFFICE 2,498,782

PREPARATION OF ARYL SULFONYL THIOUREAS

Maurice Arquet, Paris, and Paul Charpentier, Choisy-le-Roi, France, assignors to Societe des Usines Chimiques Rhone-Poulenc, Paris, France, a French company No Drawing. Application April 29, 1946, Serial No. 665,890. In France May 13, 1942

Section 1, Public Law 690, August 8, 1946
Patent expires May 13, 1962

5 Claims. (Cl. 260—397.7)

This invention is for improvements in or relating to the preparation of aryl sulphonyl thioureas.

As it is well known, aryl sulphonyl thioureas are relatively difficult to obtain, particularly since they cannot be obtained by the direct action of aryl sulphonyl halides on thiourea.

It has been found that benzene sulphonyl thiourea and its nuclear substitution products, can be obtained in a simple fashion by the reaction of hydrogen sulphide on corresponding aryl sulphonyl cyanamides according to the equation:

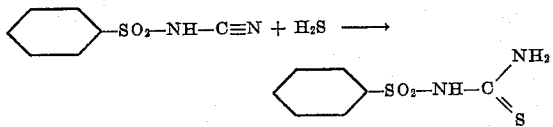

The benzene nucleus can, if desired, be substituted (especially in the para-position) by one or more alkyl, aralkyl, aryl, amino, hydroxy, alkoxy or other groups including inter alia groups convertible into amino such, for example, as acylamino.

This reaction is particularly applicable to the preparation of p-aminobenzenesulphonyl thiourea and its derivatives. If necessary, the latter can be transformed finally into p-aminobenzenesulphonyl thiourea by generally well-known methods.

The products obtained according to this invention have remarkable bactericidal and antimycosic properties, which can be utilised in the field of therapeutics.

The following non-limitative examples illustrate how the invention can be carried out in practice:

Example I 19.7 gm. of p-aminobenzenesulphonyl cyanamide are dissolved in 160 gm. of anhydrous pyridine and the solution is saturated at 0° C. with hydrogen sulphide. The whole is then heated for several hours in sealed ampoules on the water bath. After cooling and opening the containers, the excess of hydrogen sulphide and pyridine is removed in vacuo and the residue is taken up with water and acidified with acetic acid. Aminobenzenesulphonyl thiourea is precipitated. This is then filtered and purified, preferably by conversion into its sodium salt (melting point 200–201° C. corrected).

Example II 19.7 gm. of p-aminobenzenesulphonyl cyanamide are dissolved in 200 gm. of water containing 3.4 gm. of anhydrous ammonia, and the solution is saturated with hydrogen sulphide at 0° C., and heated during several hours in a sealed tube on a boiling water bath. After cooling, a little sulphur is filtered off and then the p-aminobenzenesulphonyl thiourea is precipitated with acetic acid. It is purified as in Example I.

Example III 19.7 gm. of p-aminobenzenesulphonyl cyanamide are dissolved in 200 gm. of 80% alcohol and 13.3 gm. of caustic soda solution (36° Bé.). The solution is saturated with hydrogen sulphide at 0° C. and then heated in a sealed tube on a boiling water bath. The contents of the tube become solid. After opening the tube, the sodium salt of aminobenzene-sulphonyl thiourea is filtered off. It is purified from a little sulphur and other impurities by the usual methods.

Example IV 13 gm. of the sodium salt of p-acetylaminobenzenesulphonyl cyanamide are dissolved in 100 gm. of anhydrous pyridine and saturated at 0° C. with hydrogen sulphide. The solution is heated for some hours in a sealed tube at 100° C. There is obtained a solid mass of the sodium salt of p-acetylaminobenzenesulphonyl thiourea. This is separated off, dissolved in water and precipitated by hydrochloric acid. Melting point 228° C. This product can be de-acetylated by means of 2 N caustic soda, and gives p-aminobenzenesulphonyl thiourea. Melting point 200–201° C.

Example V 10.2 gm. of the sodium salt of benzenesulphonyl cyanamide (Hebenstreit: J. f. Praktische Chemie (2), 41, 99, 105, 1890) are dissolved in 100 gm. of anhydrous pyridine and saturated at 0° C. with hydrogen sulphide. The solution is heated for several hours in a sealed tube at 100° C. The product is a solid mass of the sodium salt of benzenesulphonyl thiourea. This is dissolved in water and precipitated by hydrochloric acid. It is recrystallised from 50% methyl alcohol and gives benzene sulphonylthiourea. Melting point 138–139° C.

We claim:

1. A process for the production of acetylsulfanilyl thiourea which comprises heating sodium acetylsulfanilyl cyanamide with hydrogen sulfide under pressure.

2. The process of producing benzene sulphonyl thioureas which comprises heating a compound selected from the group consisting of benzenesulphonyl cyanamide and its p-amino and p-acetylamino derivatives with hydrogen sulphide.

3. The process of producing benzene sulphonyl thioureas which comprises heating a compound selected from the group consisting of benzenesulphonyl cyanamide and its p-amino and p-acetylamino derivatives with hydrogen sulphide under pressure.

4. The process of producing benzene sulphonyl thioureas which comprises dissolving in a basic solvent a compound selected from the group consisting of benzene sulphonyl cyanamide and its p-amino and p-acetylamino derivatives saturating the solution with hydrogen sulphide at low temperature, thereafter heating the reaction mixture under pressure and isolating therefrom the benzenesulphonylthiourea produced.

5. The process of producing benzene sulphonyl thioureas which comprises dissolving in a basic solvent a compound selected from the group consisting of benzenesulphonyl cyanamide and its p-amino and p-acetylamino derivatives, saturating the solution with hydrogen sulphide at about 0° C., thereafter heating the reaction mixture for several hours at about 100° C. in a sealed vessel and isolating therefrom the benzenesulphonylthiourea produced.

MAURICE ARQUET.
PAUL CHARPENTIER.

REFERENCES CITED

The following references are of record in the file of this patent:

UNITED STATES PATENTS

| Number | Name | Date |
| --- | --- | --- |
| 2,254,136 | Buck et al. | Aug. 26, 1941 |
| 2,336,907 | Winnek | Dec. 14, 1943 |
| 2,380,006 | Winnek et al. | July 10, 1945 |

FOREIGN PATENTS

| Number | Country | Date |
| --- | --- | --- |
| 260,061 | Germany | May 13, 1913 |
| 297,999 | Great Britain | Oct. 4, 1928 |
| 336,111 | Great Britain | Oct. 7, 1930 |

OTHER REFERENCES

Winnek et al.: "Jour. Am. Chem. Soc.," vol. 64 (1942), p. 1682.